US010253838B2

United States Patent
Socheleau (10) Patent No.: US 10,253,838 B2
(45) Date of Patent: Apr. 9, 2019

(54) LINEAR HYDRAULIC DAMPING DEVICE

(71) Applicant: Goodrich Actuation Systems SAS, Buc (FR)

(72) Inventor: Jérôme Socheleau, Vernouillet (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 240 days.

(21) Appl. No.: 15/088,203

(22) Filed: Apr. 1, 2016

(65) Prior Publication Data

US 2016/0290430 A1 Oct. 6, 2016

(30) Foreign Application Priority Data

Apr. 2, 2015 (EP) .................................... 15305489

(51) Int. Cl.
| | |
|---|---|
| F16F 9/10 | (2006.01) |
| B64C 13/36 | (2006.01) |
| F16F 9/34 | (2006.01) |
| F16F 9/512 | (2006.01) |
| F15B 15/14 | (2006.01) |
| F16F 9/348 | (2006.01) |

(52) U.S. Cl.
CPC ............... *F16F 9/10* (2013.01); *B64C 13/36* (2013.01); *F15B 15/1423* (2013.01); *F16F 9/34* (2013.01); *F16F 9/348* (2013.01); *F16F 9/512* (2013.01)

(58) Field of Classification Search
CPC ..... B64C 13/36; F16F 9/10; F16F 9/34; F16F 9/348; F16F 9/512; F16F 9/466; F15B 15/1423; F15B 15/204
USPC .............................................. 91/399; 92/143
See application file for complete search history.

(56) References Cited

U.S. PATENT DOCUMENTS

| | | | |
|---|---|---|---|
| 3,516,136 A | 6/1970 | Carter | |
| 4,449,446 A * | 5/1984 | Degnan | ................... B64C 13/36 89/36.02 |
| 5,265,965 A | 11/1993 | Harris | |
| 5,501,533 A | 3/1996 | Williams | |

(Continued)

FOREIGN PATENT DOCUMENTS

| | | | |
|---|---|---|---|
| DE | 2031158 A1 * | 12/1971 | ............ F16F 9/3214 |
| DE | 2459188 A * | 12/1974 | |
| DE | 8906232 U1 | 7/1989 | |

(Continued)

OTHER PUBLICATIONS

European Search Report for application No. EP15305489.5; dated Oct. 16, 2015, 6 pages.

*Primary Examiner* — Magdalena Topolski
(74) *Attorney, Agent, or Firm* — Cantor Colburn LLP (57) ABSTRACT

A hydraulic circuit comprising an actuator having an extension chamber and a retraction chamber, a bypass passage provided in the hydraulic circuit between defined between the extension chamber and the retraction chamber, and a damping device. The damping device includes first and second chambers separated by a wall, a first movable element received within the first chamber and a second movable element received within the second chamber. The first moveable element is movable from its closed position against the force of the first spring by entry of fluid into the second chamber, and the second movable member being movable from its closed position against the force of the second spring by entry of fluid into the first chamber.

13 Claims, 5 Drawing Sheets

(56) References Cited

U.S. PATENT DOCUMENTS 8,201,490 B2 * 6/2012 Fenny .................. F15B 15/1428
  92/151
2007/0034466 A1 2/2007 Paesmans

FOREIGN PATENT DOCUMENTS

DE    102004059702 A1 *  6/2006  .............. F16F 9/348
EP         0632212 A2    1/1995
WO    WO-2015074132 A1 *  5/2015  ............ F16F 15/023

* cited by examiner

LINEAR HYDRAULIC DAMPING DEVICE

FOREIGN PRIORITY

This application claims priority to European Patent Application No. 15305489.5 filed Apr. 2, 2015, the entire contents of which is incorporated herein by reference.

TECHNICAL FIELD

The present disclosure relates to a linear hydraulic damping device which may find use, for example, in damping forces in hydraulic actuators.

BACKGROUND

Hydraulic damping devices are used in a variety of applications to damp pressure fluctuations and forces in position controlled systems. One area where such devices are used is that of hydraulically powered actuators in aircraft systems. In an aircraft system, hydraulically powered actuators are used in a wide range of applications. One common area of application is in the actuation of control surfaces of the aircraft, for example in the actuation of nose wheel steering, elevators, rudders, ailerons, and so on. Typically the actuator must be able to extend and retract in order to allow deployment and retraction of the control system. To this end, the actuator will normally have an extension chamber into which hydraulic fluid is admitted to extend the actuator, and a retraction chamber into which hydraulic fluid is admitted to retract the actuator, i.e. move it in an opposite direction from extension. A series of valves selectively connect the extension and retraction chambers to a source of hydraulic fluid to effect the appropriate movement of the actuator.

However, in certain operating or failure conditions, for example during flight, it may be desirable to suppress certain forces which act on the control surfaces and thus on the actuator, for example to prevent flutter, shimmy or other unwanted movement of the control system. To damp such forces, a bypass line is typically installed within the hydraulic circuit, linking the extension chamber and retraction chamber of the actuator through a damping orifice. In this damping mode, any movement of the control system, and therefore of the actuator which is connected to it, will cause hydraulic fluid to pass from one of the extension and retraction chamber into the other of the extension and retraction chamber through the damping orifice, thereby damping the movement of the actuator and the control surface.

In some applications, multiple actuators may be used to move a control system. In this situation, it is common to place one actuator in an active mode, i.e. with hydraulic fluid being supplied to both extension and retraction chambers, and the other in the damped mode. Generally, when the damping ratio required is low, the damper is a quadratic damper, which means that should the control system be moved by the active actuator, the damping force generated in the damping device is proportional to the square of the actuator speed and moderate drag is generated at high speed. If the damping ratio required is high, then the drag forces generated by damped actuator at high speed will be very high, which means that the adjacent active actuator may need to be oversized to counteract this damping force. In some applications, therefore, a linear, rather than a quadratic, damping device may be used as this will reduce the damping force for a given velocity, meaning that a smaller actuator may be used.

SUMMARY

The present disclosure relates to a linear hydraulic damping device which may be used in the above applications.

A disclosed linear hydraulic damping device comprises a damper body defining a first chamber having a first fluid inlet and a second chamber having a second fluid inlet. The first and second chambers are separated by a wall. The wall has at least one first passage and at least one second passage connecting the first chamber and the second chamber. The first passage has a first end opening into the first chamber and a second end opening into the second chamber and the second passage has a first end opening into the second chamber and a second end (96) opening into the first chamber. A first movable element is received within the first chamber and is resiliently biased by a first spring towards the wall to a closed position wherein the first movable element closes the first end of the first passage but does not close the second end of the second passage. A second movable element is received within the second chamber and resiliently biased by a second spring towards the wall to a closed position wherein the second movable element closes the first end of the second passage but does not close the second end of the first passage. The first moveable element is movable from its closed position against the force of the first spring by entry of fluid into the second chamber, and the second movable member is movable from its closed position against the force of the second spring by entry of fluid into the first chamber. The movement of the first movable element away from the wall creates a first, variable damping orifice between the first end of the first passage and the first movable element. The movement of the second movable element away from the wall creates a second, variable damping orifice between the first end of the second passage and the second movable element.

By virtue of the opening of the respective passages against the force of a spring, a variable area damping orifice is created. As the flow of the fluid entering the first or second chambers increases, the greater will be the displacement of the first or second movable element. The effect created is one of a linear damper, since the pressure differential between the first and second chambers is proportional to the velocity of the fluid in the passage.

The first and second movable elements may be poppets.

In embodiments, the poppets may each be constructed with a head portion for engagement with the respective passage ends and a body portion slidably received within the respective first and second chambers.

The body portion may be hollow so as to receive the respective biasing spring.

To prevent the respective movable elements from closing the second ends of the respective passages in the closed positions, the respective second ends of the passages may be is displaced away from an adjacent portion of the respective movable element. The respective first ends of the passages may therefore be formed in raised portions of the wall relative to the respective second ends of the passages. This will allow the valve elements to have a flat head portion.

The wall may comprise a plurality of, for example two, first passages and/or a plurality of, for example two, second passages. The respective first and second passages may be angularly displaced from each other, for example at 90° from each other so that a pair of first passages are spaced apart by 180° and a pair of second passages are spaced apart by 180°.

The passages may be formed in any convenient manner, but in embodiments they may be formed by drilling.

The respective biasing springs may be mounted in the damper body such as to exert a linear variable force on the respective movable valve elements. The end of the respective biasing spring opposite the respective movable valve element may therefore engage an adjustable seat.

The seat may be provided on a member threadably received in the damper body. The respective members may close the respective first and second chambers.

It will be appreciated that this disclosure also extends to a hydraulic circuit comprising an actuator having an extension chamber and a retraction chamber, and a bypass passage provided in the hydraulic circuit defined between the extension chamber and the retraction chamber, and a damping device in accordance with this disclosure arranged in the bypass passage.

It further extends to an aircraft system comprising a control surface and a hydraulic circuit and a hydraulic circuit as above, the actuator effecting movement of the control surface.

BRIEF DESCRIPTION OF DRAWINGS

A non-limiting embodiment of this disclosure will now be described by way of example only with reference to the accompanying drawings in which.

DETAILED DESCRIPTION

Figure 1:
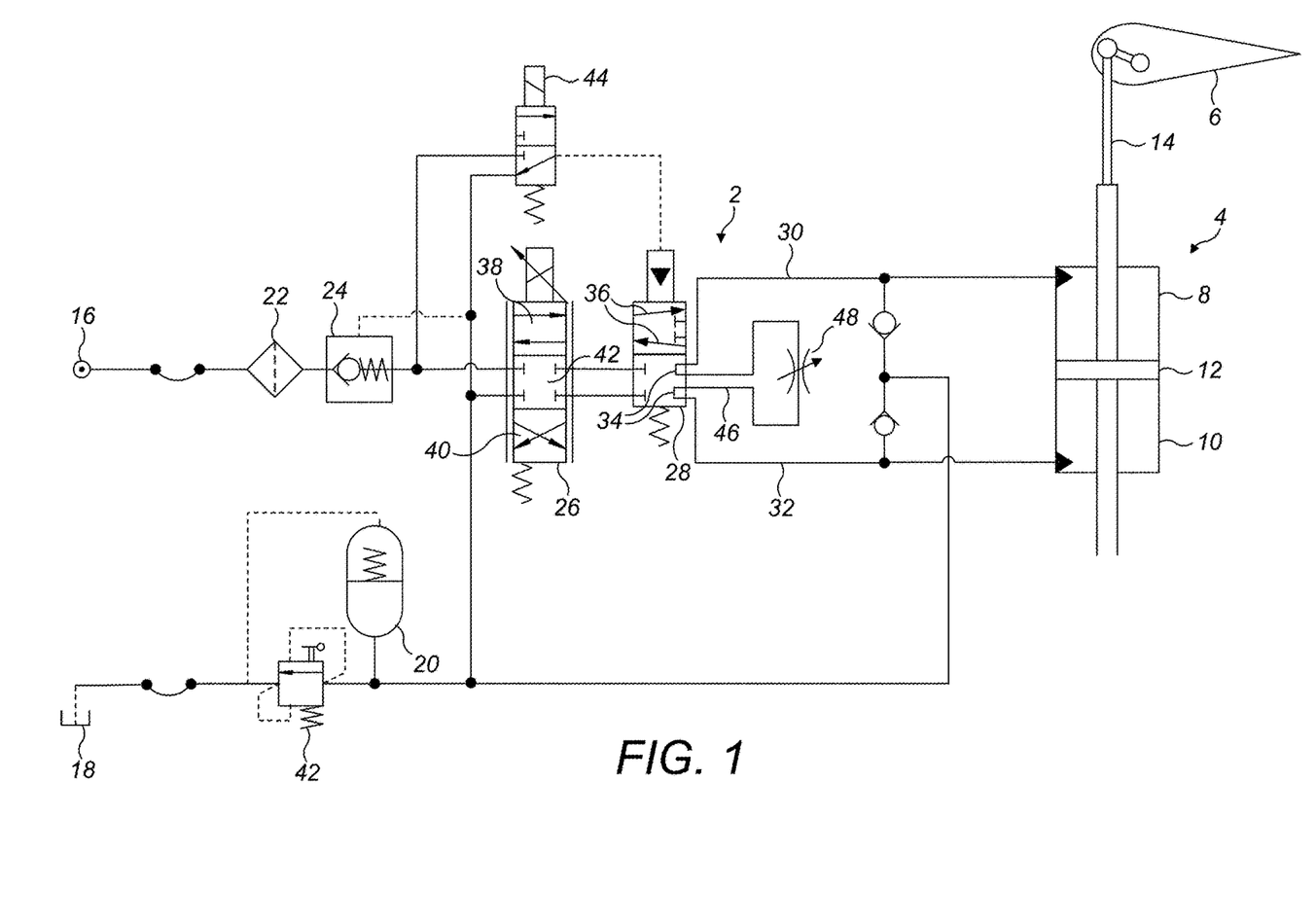
FIG. 1 illustrates a hydraulic circuit as might be used in the control of an actuator for an aircraft control surface, and incorporating a damping device.

With reference to FIG. 1, there is shown a hydraulic circuit 2 for use in controlling an actuator 4 which is connected to a control system, for example an aircraft control surface 6, illustrated only schematically on the Figure.

The actuator 4 has a retraction chamber 8 and an extension chamber 10 separated by a piston 12 connected to the surface 6 by a rod 14. The actuator hydraulic circuit 2 selectively supplies hydraulic fluid to either the retraction chamber 8 or the extension chamber 10 in order to move the piston 12 and rod 14 so as either to retract or extend the control surface 6.

The hydraulic circuit comprises a pressurised source of hydraulic fluid 16, for example the aircraft hydraulic circuit power supply line, a return 18, for example the aircraft hydraulic circuit return line and an accumulator 20. Hydraulic fluid is supplied from the source 16 through a filter 22 and a check valve 24 to an electro-hydraulic servo valve 26. Hydraulic fluid is directed through the servo valve 26 to a mode valve 28 and from the mode valve 28 to the extension and retraction chambers 10, 8 through lines 30, 32. Fluid forced from the other of the chambers 8, 10 is returned to the accumulator 20.

The mode valve 28 has two position, namely an active position and, as shown in FIG. 1, a damping position. In the damping position, as shown, flow paths 34 in the mode valve 28, place the extension and retraction chambers 10, 8 in fluid communication through hydraulic lines 30, 32 and through a linear damper 48 as will be described further below. In the active mode, flow paths 36 in the mode valve 28 place the extension and retraction chambers 10, 8 in fluid communication through hydraulic lines 30, 32 with the servo valve 26.

The mode valve 28 is controlled through a solenoid valve 44 and is operated such that it is moved to its active position when the position of the surface 6 needs to be controlled by the servo valve 26 so that hydraulic fluid can be supplied to the actuator 4. It is moved to its damping position in the event that damping of the actuator 4 is required.

The servo valve 26 is movable between three positions, namely a neutral position as shown in FIG. 1, an extension position and a retraction position In active mode, to retract the actuator 4, the flow paths 38 of the servo valve 26 are placed in fluid communication with the flow paths 36 of the mode valve 28 for moving the piston 12 and ram 14 in an extend direction. In the second active position of the servo valve 26, flow paths 40 thereof are placed in fluid communication with the flow paths 36 of the mode valve 28 for moving the piston 12 and ram 14 in the opposite, retract direction. In the neutral position of the servo valve 26, flow paths 42 isolate the mode valve 28 from the servo valve 26 and the fluid source 16.

In the damping position, the mode valve 28 creates a bypass path 46 in which is positioned a damping device 48. This means that any movement of the actuator piston 12 (which may be caused by movement of the control surface 6) will cause transfer of hydraulic fluid from one of the retraction chamber or extension chamber 8, 10 to the other through the lines 30, 32, bypass path 46 and damping device 48, thereby creating a damping effect.

The damping device 48 illustrated in FIG. 1 is in this embodiment a linear damping device, namely one which provides a damping force which is proportional to the flow across the damping device 48. This is potentially advantageous for the reasons discussed in the background to the disclosure.

Details of the damping device 48 will now be described in greater detail with reference to FIGS. 2 to 4.

Figure 2:
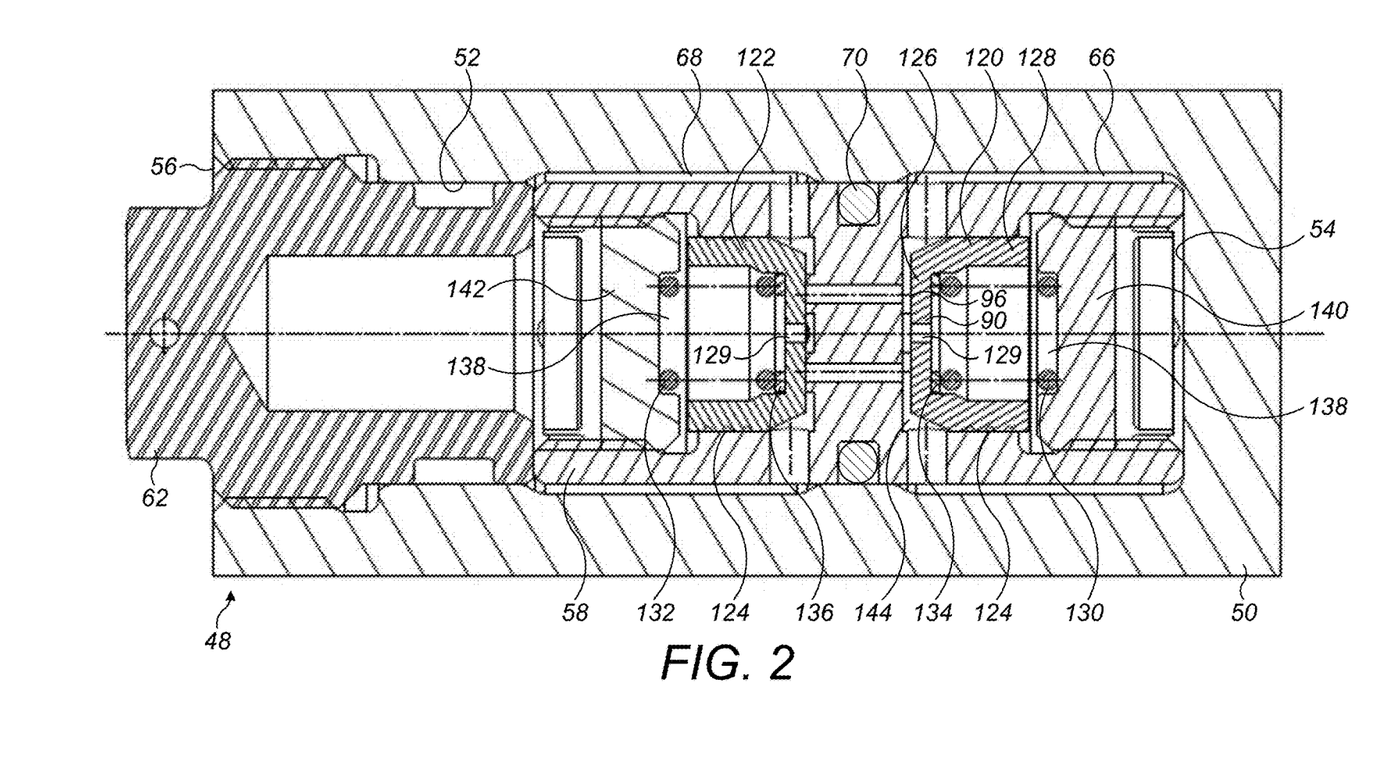
FIG. 2 shows a cross sectional view a damping device in accordance with this disclosure and as may be used in the hydraulic circuit of FIG. 1.

With reference to FIG. 2, the damping device 48 comprises an outer housing 50 having a bore 52 having a first, closed end 54 and a second open end 56. Received within the bore 52 of the housing 50 is a damper body 58. One end 60 of the damper body 58 engages the closed end 54 of the bore 52. The damper body 58 is retained within the bore 52 by means of a retaining element 62, for example a threaded retaining element, which engages the opposite end 64 of the damper body 58.

In this embodiment, the valve body 58 is shown as a one piece component, but it will be understood that it may be constructed in more than one piece, for example in two halves, and that these pieces may be installed in 2 separated bores.

First and second annular chambers 66, 68 are formed between the inner surface of the bore 52 and the damper body 56. The channels 66, 68 are sealed from one another by means of an O ring 70 received in an annular groove 72 formed on the external surface of the damper body 56.

The first annular chamber 66 is intended to be connected to the extension chamber 8 of the actuator 4 by suitable means while the second annular chamber 68 is intended to be connected to the retraction chamber 10 of the actuator 4. Of course, the connections may be the other way around.

Figure 3:
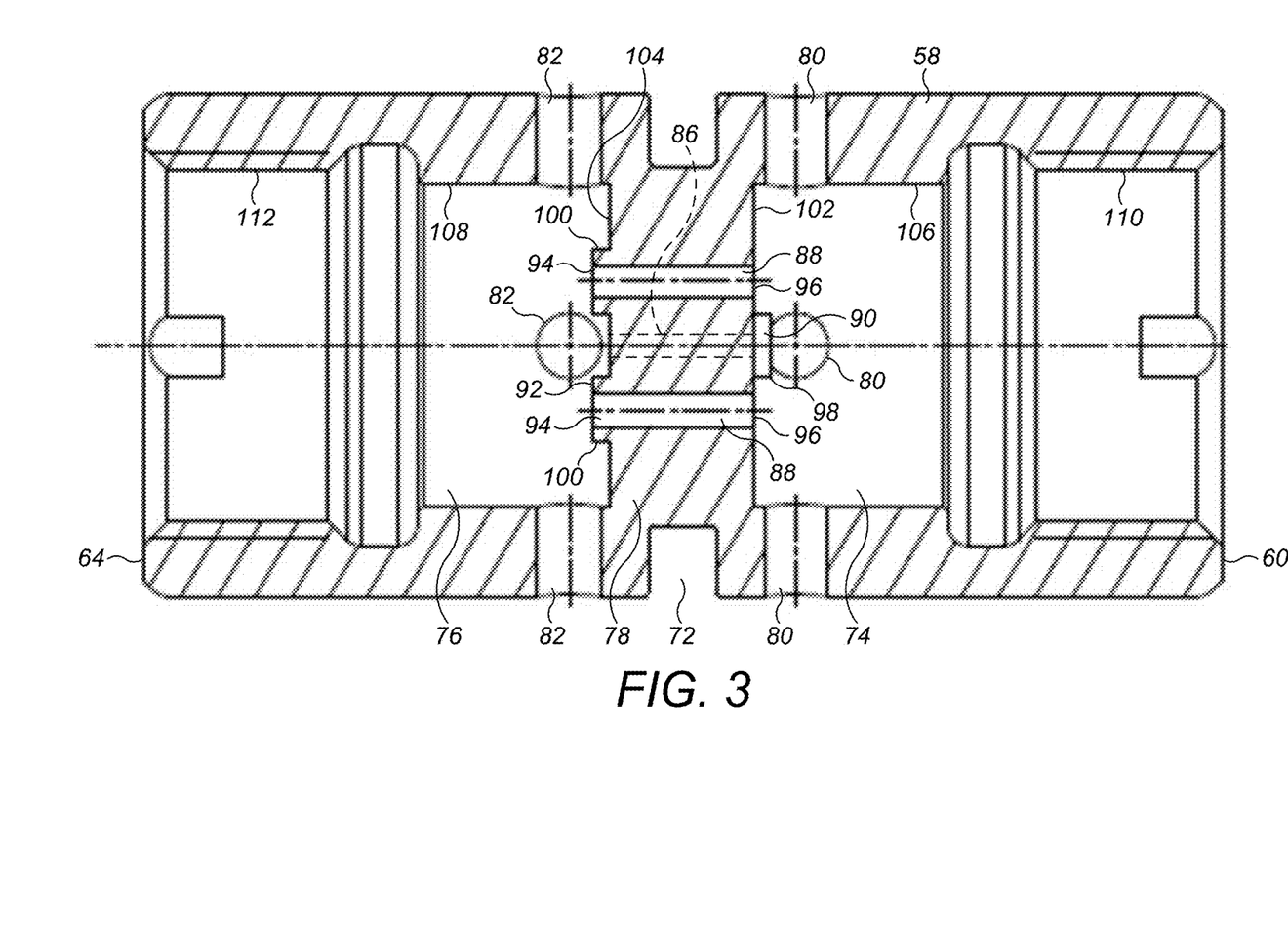
FIG. 3 shows an enlarged cross sectional view of a part of the device of FIG. 2.

As can be best seen in FIG. 3, the damper body 56 is an essential cylindrical hollow body defining a first chamber 74 and a second chamber 76 separated by a wall 78. A plurality of first inlets 80 connects the first chamber 74 with the first annular chamber 66. A plurality of second inlets 82 connects the second chamber 76 with the second annular chamber 68. In this particular embodiment, there are four first and second inlets 80, 82 arranged at regular circumferential spacing around the damper body 56. Of course other numbers of inlets 80, 82 may be provided, and they may be provided in other configurations.

A plurality of passages extend through the wall 78 so as to connect the first chamber 74 and second chamber 76. In this embodiment there are two first passages 86 and two second passages 88. The first passages 86 have a first end 90 which opens into the first chamber 74 and a second end 92 which opens into the second chamber 76. The second passages 88 have a first end 94 which open into the second chamber 76 and a second end 96 which opens into the first chamber 74.

Figure 4:
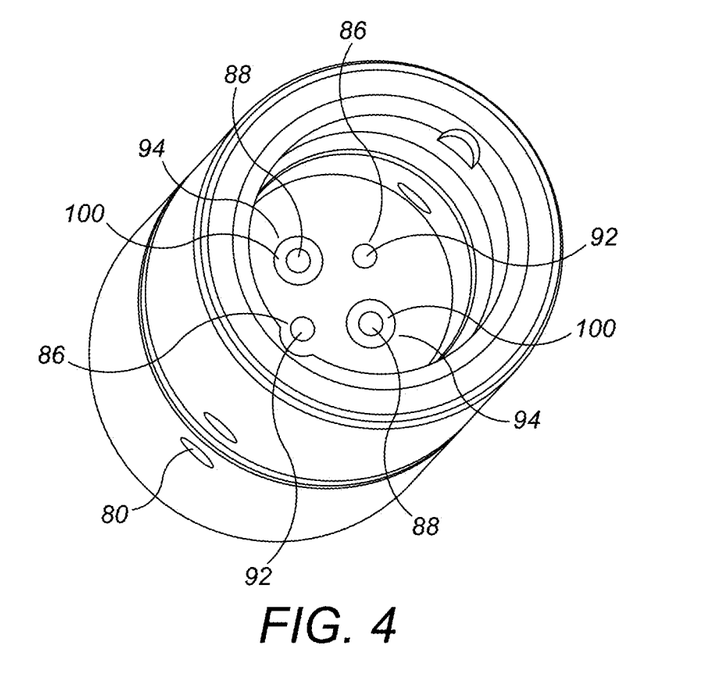
FIG. 4 shows a perspective end view of the part shown in FIG. 4.

As can be seen, for example from FIG. 4, the first and second passages 86, 88 are arranged in diametrically opposed pairs. Thus each passage 86, 88 is spaced 90° from the adjacent passage 86, 88. Of course other arrangements and numbers of passages may be provided in accordance with this disclosure. For example, more than two pairs of passages may be provided. The precise number of passages will depend on the particular application.

Moreover, the first and second passages 86, 88 may have a different cross sectional area diameter from each other, for example in situations where different damping effects are required in the extension and retraction directions, or if the actuator design is unbalanced.

As can also be seen from FIGS. 3 and 4 the respective first ends 90, 94 of the first and second passages 86, 88 are formed in posts 98, 100 which project from the surrounding wall surfaces 102, 104. The reason for this will be discussed further below.

The first and second chambers 74, 76 are cylindrical in shape being formed from respective first and second bores 106, 108. The bores 106, 108 open up into larger, threaded sections 110, 112 as will be described further below.

As shown in FIG. 2, a first moveable element 120 is slidably received within the first bore 106 and a second moveable element 122 is received within the second bore 108. The first and second movable elements 120, 122 have grooves 124 around their periphery for a better pressure distribution against the walls of the bores 106, 108.

The moveable elements 120, 122 are, in this embodiment, poppets each having a head portion 126 and a cylindrical hollow body portion 128. A pressure equalisation port 129 is formed through the head portion 126 of each poppet 120, 122.

The hollow body portion 128 of each poppet 120, 122 receives one end of a biasing spring 130, 132 which exerts a biasing force against a washer 134, 136 arranged behind the poppet head 124. Of course a washer 134 need not be used in embodiments. While the biasing springs 32, 134 are shown in this embodiment as being coil springs, other forms of springs may be used, for example spring washers.

The other end of each biasing spring 130, 132 is received in a seat 138 in a respective threaded setting member 140, 142, threadably received within the threaded portions 106, 108 of the damper body 56.

As can be seen from FIG. 2, which shows the poppets 120, 122 in a closed position, when in the closed position, the head 124 of the first poppet 120 closes the first ends 90 of the first passages 86. However, the poppet 120 does not close the second ends 96 of the second passages 88 since the posts 98 space the poppet head 124 from those ends 96. Similarly in the closed position, the head 124 of the second poppet 122 will close the first ends 94 of the second passages 88 but not the second ends 92 of the first passages 86, due to the posts 100.

The poppets 120, 122 are biased into their closed positions by the biasing springs 130, 132. This is the default position which is adopted when there is no or only a small pressure difference applied between the first and second chambers 74, 76. However, in the event of a pressure differential being applied between the chambers 74, 76, which exceeds the biasing force then one or other of the poppets 120, 122 will move, thereby opening one or other of the first or second passages 86, 88 to create a damping effect as is discussed further below.

When the hydraulic circuit 2 is in a damping mode, as illustrated in FIG. 1, a force acting on the control surface 6 will cause movement of the actuator piston 12 in one or other direction. If that movement is in the extension direction, then hydraulic fluid will be forced from the retraction chamber 10 into the first annular chamber 66 of the damping device 50. The hydraulic fluid passes through the first inlets 80 into the first chamber 74 of the damping body 56. The fluid is able to pass along the spacing 144 between the dividing wall 78 and the head 124 of the first poppet 120. Since the fluid acts both on the front side and rear side of the head 124 (by virtue of the pressure equalisation hole 130), the first poppet 120 does not lift against the pressure of the first biasing spring 130. However, fluid is able to enter the second ends 96 of the second passages 88 and exert a force on the second poppet 122. In effect the poppet acts as a one way valve, only permitting flow through the second passages, but not the first.

Accordingly, when the force exerted by the fluid on the second poppet exceeds the spring force of the second biasing spring 132, the head 124 of the second poppet 122 will lift from the first ends 94 of the second passages 88, thereby creating damping orifices between the first ends 94 of the second passages 88 and the poppet head 124. The fluid flowing through these orifices is then able to exit the second chamber 76 through the second inlets 82 and thereby be conducted via the second annular chamber 68 back to the extension chamber 8.

If the movement of the piston head is in the opposite direction, then fluid will enter the second chamber 76 and open the first poppet 120 against the biasing force of the first biasing spring, in a similar manner to that described above. Thus a damping effect is achieved with movement of the actuator 4 in either direction.

Figure 5:
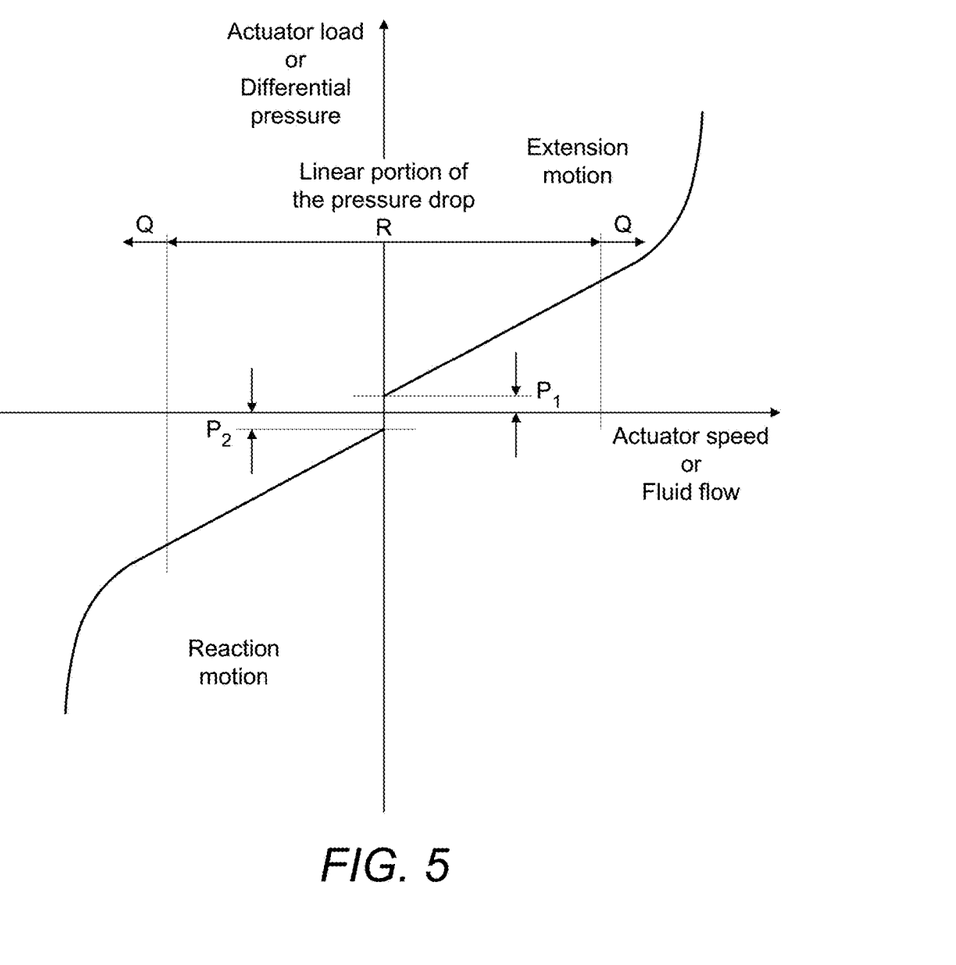
FIG. 5 is a graph illustrating, schematically, the damping effect provided by the damping device.

The dimensions of the respective first ends 90, 94 of the first and second passages 88 and the spring force of the first and second biasing springs 130, 132 are chosen to provide a linear damping effect. Thus as seen from FIG. 5, once the differential pressure across the device overcomes the biasing force of the springs 120, 122 (as illustrated by values P1 and P2 in FIG. 5), the damping effect is linear at least over a range R as illustrated in FIG. 5. This is because, thanks to the variable orifice area created between end 90 and poppet 120 or between end 94 and poppet 122 the differential pressure drop across the damper device 48 will be proportional to the fluid velocity within the passages 86, 88 in this range. However, once the poppets 120, 122 are fully displaced such that they engage the respective setting members 140, 142, the damping effect becomes quadratic, as the damping orifice size effectively becomes fixed. This is illustrated by the ranges Q in FIG. 5.

The first and second springs 130, 132 are, in this embodiment, chosen such that the device operates symmetrically, however, this is not essential. The spring force exerted by the springs 130, 132 can be adjusted by adjustment of the screw threaded setting elements 140, 142, thereby effectively adjusting the opening pressure of the damping device.

By providing a linear damping effect, higher damping forces can be provided at low actuator speeds without affecting significantly adjacent actuator performance at high speed thus smaller actuators may potentially be used, particularly in the operation of flight control surfaces control where multiple actuators may be used to move a single control surface.

It will be understood that the above is a description of an embodiment only and that modifications may be made to the embodiment without departing from the broad scope of the disclosure. For example, while the damper of the embodiment is shown as applied in the context of a flight control surface, it may of course be used in any other system where linear damping is required.

The invention claimed is:

1. A linear hydraulic damping device comprising:
a damper body defining a first chamber having a first fluid inlet and a second chamber having a second fluid inlet;
the first and second chambers separated by a wall;
the wall having at least one first passage and at least one second passage connecting the first chamber and the second chamber, the first passage having a first end opening into the first chamber and a second end opening into the second chamber and the second passage having a first end opening into the second chamber and a second end opening into the first chamber;
a first movable element received within the first chamber, and resiliently biased by a first spring towards the wall to a closed position wherein the first movable element closes the first end of the first passage but does not close the second end of the second passage;
a second movable element received within the second chamber and resiliently biased by a second spring towards the wall to a closed position wherein the second movable element closes the first end of the second passage but does not close the second end of the first passage;
the first moveable element being movable from its closed position against the force of the first spring by entry of fluid into the second chamber and into the second end of the first passage, and the second movable element being movable from its closed position against the force of the second spring by entry of fluid into the first chamber and into the second end of the second passage;
the movement of the first movable element away from the wall creating a first, variable damping orifice between the first end of the first passage and the first movable element; and
the movement of the second movable element away from the wall creates a second, variable damping orifice between the first end of the second passage and the second movable element;
wherein the respective first and second movable elements are poppets; and
wherein each movable element comprises a head portion for engagement with the respective first passage ends and a body portion slidably received within the respective first and second chambers.

2. The damping device as claimed in claim 1, wherein the body portion of the first moveable element is hollow so as to receive an end of a the first biasing spring and wherein the body portion of the second moveable element is hollow so as to receive an end of the second biasing spring.

3. The damping device as claimed in claim 1, wherein the respective second ends of the first and second passages are displaced from an adjacent portion of the respective movable element.

4. The damping device as claimed in claim 3, wherein the respective first ends of the first and second passages are formed in raised portions of the wall relative to the respective second ends of the first and second passages.

5. The damping device as claimed in claim 1, wherein the movable elements have planar head portions.

6. The damping device as claimed in claim 1, comprising a plurality of first passages and/or a plurality of second passages.

7. The damping device as claimed in claim 6, comprising opposed pairs of first and second passages.

8. The damping device as claimed in claim 1, wherein the respective biasing springs are mounted the damper body such as to exert a variable force on the respective movable valve elements.

9. The damping device as claimed in claim 8, wherein the end of the first biasing spring opposite the first movable element engages a first movable seat and wherein the end of the second biasing spring opposite the second movable element engages a second movable seat.

10. The damping device as claimed in claim 9, wherein the first seat is provided on a member threadably received in the damper body.

11. The damping device as claimed in claim 10 wherein the member closes the first chamber.

12. A hydraulic circuit comprising:
an actuator having an extension chamber and a retraction chamber;
a bypass passage provided in the hydraulic circuit between defined between the extension chamber and the retraction chamber; and
a damping device as claimed in claim 1 arranged in the bypass passage.

13. An aircraft system comprising a control surface and a hydraulic circuit as claimed in claim 12, wherein the actuator effects movement of the control surface.

* * * * *